US009281692B2

(12) United States Patent  (10) Patent No.: US 9,281,692 B2
Hui  (45) Date of Patent: Mar. 8, 2016

(54) POWER DISTRIBUTION UNIT, COMMUNICATION DEVICE USED WITH SAME, AND POWER DISTRIBUTION SYSTEM

(71) Applicant: TYPHOON HONG KONG LIMITED, Hong Kong (HK)

(72) Inventor: Kin Fai Hui, Hong Kong (HK)

(73) Assignee: TYPHOON HONG KONG LIMITED, Hong Kong (HK)

( * ) Notice: Subject to any disclaimer, the term of this patent is extended or adjusted under 35 U.S.C. 154(b) by 467 days.

(21) Appl. No.: 13/846,918

(22) Filed: Mar. 18, 2013

(65) Prior Publication Data

US 2013/0241287 A1  Sep. 19, 2013

Related U.S. Application Data

(63) Continuation of application No. PCT/CN2011/080414, filed on Sep. 30, 2011.

(60) Provisional application No. 61/387,982, filed on Sep. 30, 2010.

(51) Int. Cl.
*H02J 4/00* (2006.01)
*H02J 13/00* (2006.01)

(52) U.S. Cl.
CPC .............. *H02J 4/00* (2013.01); *H02J 13/0006* (2013.01); *Y10T 307/461* (2015.04)

(58) Field of Classification Search
CPC ........ H02H 4/00; H02J 13/00; Y10T 307/461
USPC ......................................................... 307/38
See application file for complete search history.

(56) References Cited

U.S. PATENT DOCUMENTS

| 6,741,442 | B1 * | 5/2004 | McNally | G06F 1/206 307/41 |
| 7,522,036 | B1 * | 4/2009 | Preuss | H05K 7/1457 307/150 |
| 2007/0184721 | A1 * | 8/2007 | Ewing | H02B 1/26 439/620.26 |

(Continued)

FOREIGN PATENT DOCUMENTS

| CN | 101588085 | 11/2009 |
| CN | 101640345 | 2/2010 |

(Continued)

OTHER PUBLICATIONS

International Search Report of PCT/CN2011/080414.
1st Office Action of counterpart Taiwanese Patent Application No. 100135484 issued on Dec. 22, 2014.

*Primary Examiner* — Scott Bauer

(57) ABSTRACT

A power distribution unit, a communication device used with same, and a power distribution system. The power distribution unit comprises a master management module (331), and at least a group of socket management modules (211). The socket management module (211) is used to manage power output. The master management module (331) is connected to each socket management module (211), and is used to monitor a power output state of each socket management module (211) and control a switching state of the power output of each socket management module (211). The master management module (331) comprises an incoming port (431) and an outgoing port (432) for connection to external devices. The power distribution system comprises the power distribution unit and the communication device coordinating with the power distribution unit. The system can implement intelligent remote monitoring on the power distribution unit, and effective monitoring on a surrounding environment of the power distribution unit.

19 Claims, 3 Drawing Sheets

(56) References Cited

U.S. PATENT DOCUMENTS

| | | | |
|---|---|---|---|
| 2009/0041626 A1* | 2/2009 | Atkin | B01L 3/502715 422/68.1 |
| 2011/0062780 A1* | 3/2011 | Verges | H02J 13/001 307/38 |
| 2013/0049466 A1* | 2/2013 | Adams | G06F 1/266 307/39 |

FOREIGN PATENT DOCUMENTS

| | | |
|---|---|---|
| CN | 101640488 | 2/2010 |
| CN | 101740954 | 6/2010 |
| TW | M348951 U | 1/2009 |
| TW | 201001837 A | 1/2010 |
| TW | M384454 U | 7/2010 |

* cited by examiner

POWER DISTRIBUTION UNIT, COMMUNICATION DEVICE USED WITH SAME, AND POWER DISTRIBUTION SYSTEM

CROSS REFERENCE TO RELATED APPLICATIONS

This application is a continuation application of PCT/CN2011/080414 filed on Sep. 30, 2011, which claims the benefit of U.S. Provisional Application No. 61/387,982 filed on Sep. 30, 2010; the contents of which are hereby incorporated by reference.

FIELD OF THE PATENT APPLICATION

The present application is directed to the field of communication, specifically, to a power distribution unit, communication device used with same, and power distribution system.

BACKGROUND

Power distribution unit (PDU) is a power supply distribution electrical interface product solely for use in cabinets that is designed for providing power distribution to electrical equipments for use in various information networking systems such as mainframe computers, controllers, servers, routers etc. PDU is widely used in the monitoring of computer rooms in various industries and is used in researches by most of the system integrators and automation companies. PDU is a power distributing equipment for the networking cabinets that provides high cost-performance ratio, stability and reliability. A PDU provides suitable rack mounted power distribution solutions according to different power demands.

As computer networking technology develops, and the demand of critical electrical equipments such as the server, exchanger, etc. increases. The relevant businesses become ever more important as well as the requirements of the installation environment of the equipments (such as computer rooms, cabinets etc). All the facilities that involve in the critical equipment operations must be highly reliable and usable. Through the use of PDU, the level of safety regarding the power sources of network products can be raised, and the demand of power input of critical equipments can be satisfied. PDU serves as the last juncture for power to be utilized by the equipments. If the PDU is not sufficiently stable and lacks sufficient protection, expensive equipments may be damaged and a collapse of the whole system may be resulted. Therefore, the safety and stability level of PDU is one of the sound guarantees for the economic value of equipments and business system. Performing effective monitoring and controlling of the PDU is an indispensable necessity.

SUMMARY

There is provided a power distribution unit including a master management module and at least one set of socket management modules which manages a power output. The master management module connects to each of the socket management modules for monitoring the power output state of each of the socket management modules and controlling the switching state of the power output of each of the socket management modules. The master management module further includes an incoming port and an outgoing port for connecting to external devices. The master management module is a field replaceable module.

The power distribution unit further includes an internal management module that connects to the master management module for managing the power parameter of the power distribution unit, wherein the internal management module is monitored and controlled by the master management module. The internal management module includes at least one of a power input management modules, a power phase management modules and a power supply management modules; wherein the master management module is connected to the power input management module, power phase management module and the power supply management module, respectively, for managing the power input through the power input management module, the power phase through the power phase management module and the power supply through the power supply management module.

In another embodiment, the power distribution unit further includes a sensor module that connects to the master management module for obtaining the surrounding environmental parameters of the power distribution unit. The sensor module includes at least one of temperature sensor, humidity sensor, door open/close state sensor, smoke sensor, vibration sensor, air flow sensor, dew point sensor, flood sensor, and sensor that detect the contact state with other equipments.

In another embodiment, the sensor module includes an alarm instruction unit for sending out alarming instruction when the environmental parameter has been detected as having reached a pre-set alarming value.

In another embodiment, the master management module includes at least one environmental sensing connection port for sensing the surrounding environment parameters wherein the said sensing connection port connects to a set of sensors.

In another embodiment, the power distribution unit further includes a power adaptor for providing DC power supply to other modules, wherein a plurality of power distribution units cascade, the cascading of the plurality of power distribution units through individual master management module is in the form of a daisy-chain and when the plurality of power distribution units cascade by serial and controller area network BUS (CAN-BUS), the number of cascades exceeds 255.

In another embodiment, the power distribution unit may include a LCD monitor for displaying locally.

Further, there is provided a detachable communication device which is used in coupled with the power distribution unit includes a connection cable for use with hot-plugging connection with the power distribution unit.

In another embodiment, the detachable communication device may further include an encryption dongle for achieving software and/or hardware protection.

In another embodiment, the detachable communication device may include a wired network port for communicating with a network computer via wire, and/or a wireless network port for communicating wirelessly with the network computer wherein the wired network port is a RJ45 interface. A plurality of detachable communication devices shares one network computer and the said network computer is capable of managing more than 65536 said detachable devices.

Further, there is provided a power distribution system which includes a power distribution unit and a detachable communication device detachable from connecting with the power distribution unit; the power distribution unit comprises a master management module and at least one set of the socket management modules which manage power output; the master management module connects to each of the socket management modules for monitoring power output state of each of the socket management modules, and controlling the switching state of the power output of each of the socket management modules; the master management module comprises an incoming port and an outgoing port that are used to connect to an external device, the power distribution unit connects to the detachable communication device through the incoming port of a master management module.

In another embodiment, the power distribution system is provided with a platform with an edge for coupling with the detachable communication device is provided on the power distribution, and the detachable communication device is placed directly on and interlocked with the power distribution unit by the platform.

The power distribution unit of the present application can effectively manage the power output status of the power distribution unit by using the master management module. The master management module also provides an incoming and an outgoing port that connect to the external device for conveniently communicating with, for example, the communication device and for cascading with other master management modules. This way, the power distribution unit not only can effectively monitor and control the power parameters and also can conveniently perform intelligent remote monitoring of the power distribution unit.

DETAILED DESCRIPTION

The power distribution unit of the embodiment of the present application, in general term, includes a housing of the power distribution unit, a power input component inside the housing, a set of power output components on the housing. At least one of the power output components can connect to one or multiple external loads.

The power distribution unit can also include the power management module. The power management module is a field replaceable module, which can be used to monitor the power output status or control the switching state of the power output, such as on, off and power-cycling. The power management module can also connect to one or multiple sensors used for detecting the surrounding environment for the purpose of monitoring and controlling the surrounding environment of the power distribution unit.

The power distribution unit cascades through the power management module to interconnect with multiple power distribution units. The power management module provides power for data interface at the same time provides power to the connected external device and performs data communication. For each of the power management module of the power distribution units that cascades, only one power management module needs to be directly connected to the external device for the purpose of transmitting the data of other power management modules to the power management module that is directly connected to the external device so that the data can be sent to that external device. This external device may include a network interface for coupling to the exterior network. During network transmission, standard network protocols, such as the TCP/IP Protocol and Simple Network Management Protocol, may be used.

Figure 1:
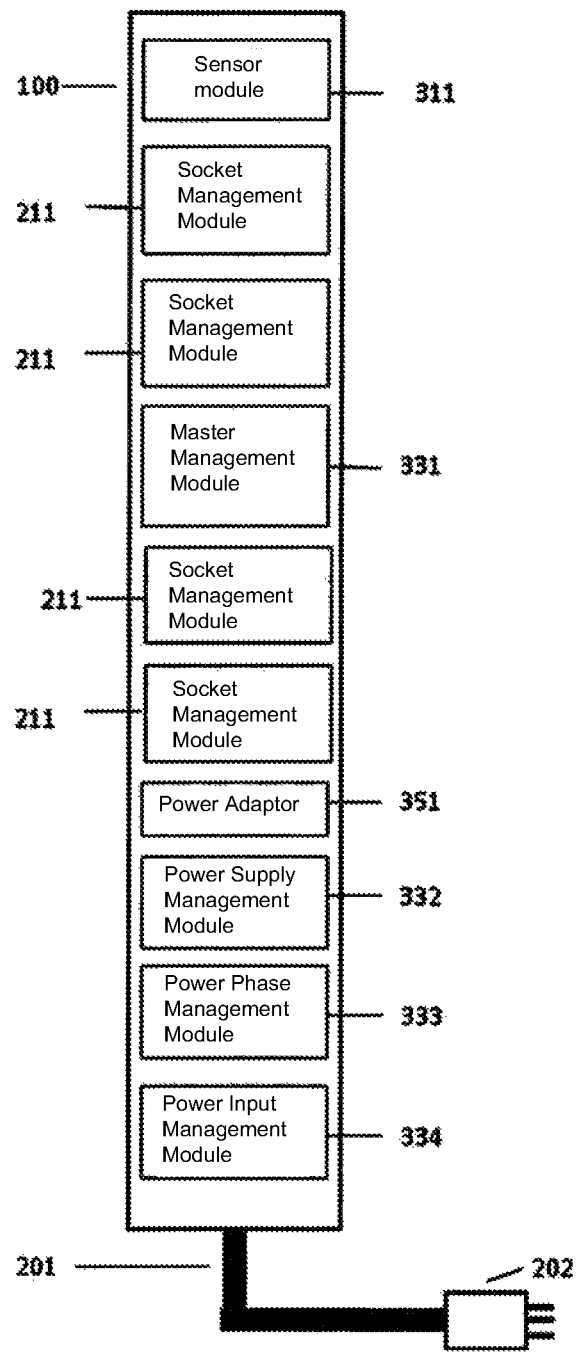
FIG. 1 shows a perspective view of a power distribution unit of an embodiment of the present application.

As illustrated in FIG. 1, a power distribution unit of an embodiment of the present application includes a power distribution unit housing 100 and a power input cord 201. The power input cord 201 includes a power socket 202 which can receive AC/DC power.

The power distribution unit is provided with a socket management module 211. The socket management module 211 manages one or more power sockets that are used to connect to the load and are located on the power distribution unit housing 100. The power related information of each power socket can be calculated and recorded.

The power distribution unit is provided with a master management module 331 (equivalent to power management module), being the core management module in the power distribution unit. The master management module 331 can perform all-round management of the power distribution unit, i.e., to manage the power parameters within the power distribution unit. An internal management module can be provided to manage the power parameter inside the power distribution unit and the master management module 331 can manage the internal management module. FIG. 1 illustrates the internal management module which includes the power input management module 334, the power phase management module 333, the power supply management module 332. Clarification should be made in that, the types and numbers of the internal management modules in the drawing are merely non-limiting examples and do not impose any limitation on the types and number of modules used. Power input management module 334, power phase management module 333 and power supply management module 332 can all be provided as one or many types of internal management modules and it is not limited to the above-mentioned.

The master management module 331 monitors the status and use of the power and also controls power output. For non-limiting example, the management of the parameters of the power input of the power distribution unit, the power phase, the cycle, the voltage and current of each of the power supply in the power distribution unit, which includes calculation, monitoring and control etc. can be performed through the power input management module 334, the power phase management module 333, the power supply management module 332 and the master management module 331.

Furthermore, the master management module 331 also connects to one or more socket management modules 211 and manages of each of the socket management modules 211. For non-limiting example, a control relay can be used to independently control and switch between the on and off states of each socket for the purpose to control each socket to provide or deter the supply of power to the electric load which is connected to the socket respectively. All the power sockets can be turned on through buttons.

The master management module 331 may also include an LCD monitor, for monitoring and displaying various required information such as the condition of usage of energy of each socket.

As illustrated in FIG. 1, the power distribution unit is also provided with a sensor module 311. The sensor module 311 includes one or more interfaces for providing power and communicates with the external sensors of various types. These sensors detect various kinds of parameters in the surrounding environment. Sensors such as temperature sensor, humidity sensor, door open/close state sensor, smoke sensor, vibration sensor, air flow sensor, dew point sensor, flood sensor and one or more types of sensors that detect the contact state with other equipments, detect the surrounding parameters in relation to temperature, humidity, vibration, smoke, flood, open/close state of doors of rack/cabinet that the power distribution unit is placed, the status of contact between the power distribution unit and other equipments respectively.

The sensor module 311 records the status of each sensor. For non-limiting example, by using the temperature or humidity sensors the temperature or humidity level of the surrounding area of the power distribution unit can be detected. The detected temperature value or humidity value is recorded by the sensor module 311. The sensor module 311 also includes an alarming instruction unit wherein an alarming value as pre-set by the user is stored. When the detected temperature or humidity degree has exceeded the pre-set alarming value, an alarming instruction will be sent out. The sensor module 311 can be managed by the master management module 331. The master management module 331 connects to the sensor module 311 and obtains the immediate temperature or humidity values that are gathered by the sensor module 311 which can be immediately displayed on the LCD monitor.

Furthermore, at least one environmental sensing connection port can be provided on the master management module. The environmental sensing connection port can be connected to one set of sensors that senses the parameters of the surrounding environment, such as the temperature sensor and the humidity sensor. The power distribution unit is also provided with a power adaptor 351. The power adaptor 351 process the external adapted current by AC-DC/DC-DC conversion for providing suitable DC power source for each module within the power distribution unit housing 100. These modules include master management module 331, socket management module 211, power input management module 334, power phase management module 333, power supply module 332 and sensor module 311, etc.

Figure 2:
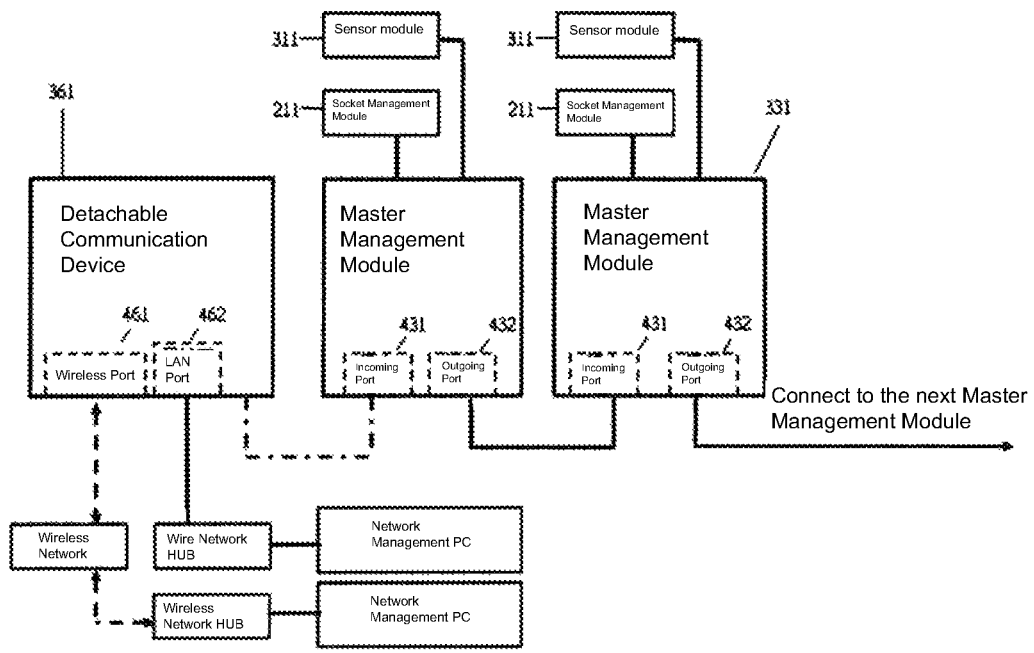
FIG. 2 shows a perspective view of the power distribution unit of an embodiment of the present application.

In FIG. 2, the solid lines represent wired connection achieved by using cables such as the CAT-5 or CAT-6 cables, etc.; the dash lines represent wireless connection; the dot-and-dash lines represent connection lines.

As illustrated in FIG. 2, the master management module 331 includes a incoming port 431. Through a connection line, the incoming port 431 of the master management module 331 can be detachably connected to a communication device 361 such that data communication can be carried out with this detachable communication device 361 and DC power can be provided thereto. Along the connection, encryption dongle can be set up to achieve software or hardware protection. Connection lines can be provided with the detachable communication device 361 and can be hot-plugged into the incoming port 431 of the master management module 331 or unplugged from the incoming port 431 (during hot plugging, interrupting and restarting of electricity are not required).

The master management module 331 also includes an outgoing port 432. The outgoing port 432 of a master management module 331 connects to an incoming port 431 of another master management module 331. Based on this form of connection, multiple master management modules 331 can be connected together and form a cascading chain (daisy-chain). By serial or controller area network BUS (CAN-BUS) technology, the number of master management modules chained together can exceed 255.

The master management module chain merely requires the connection between one of the master management modules 331 and the previously mentioned detachable communication device 361 (through the incoming port 431 of this master management module 331). This master management module 331 is known as the core master management module 331. Emphasis should be made that this terminology is merely for descriptive convenience for illustrating the direct connection method between the core master management module and the detachable communication device 361. This aims to distinguish the indirect connection method formed by the connection of other master management modules 331 with the detachable communication device 361 connected through the core master management module 331. However, this does not imply that the core master management module is not functionally different from the other master management modules.

The above master management module chain merely requires a direct connection between the communication device 361 and the incoming port 431 of the core master management module 331 so that only one IP address is required. By utilizing the connection between the communication device 361 and the computer, intelligent remote monitoring and controlling of the master management modules 331 can be achieved.

Each master management module 331 is able to collect information of all modules which it manages respectively, including the data and/or status of the sensor module 311, socket management module 211, etc. For the core master management module 331, besides the data and/or status of all the modules which it manages, the data of other master management modules 331 are also transmitted to this core master management modules 331.

The data transmitted by the core master management module 331 can be forwarded to its connected detachable communication device 361. The detachable communication device 361 includes wireless port 461 (wireless communication port) and/or LAN port 462 (wire communication port), which couples the data transmitted by the core master management module 331 to the wired or wireless network and forward the same to the network management PC at the other end of the network (a computer installed with management software). When wired connection is established with the network management PC, the wired communication port can be, for non-limiting example, an RJ45 interface. When a wireless connection is established with the network management PC, data can be transmitted to the network management PC through the antenna of the wireless transmitter. Transmission of data may utilize standard network protocols such as the TCP/IP protocol, SNMP protocol, etc. The detachable communication device 361 can be set up with an encryption dongle to achieve software and hardware protection.

The network management PC manages one or more detachable communication device 361 that is connected through wired or wireless network. The number of manageable detachable communication devices 361 can exceed 65536. That is, the network management PC can achieve monitoring and controlling of over 16711680 (255*65536) master management modules 331.

Figure 3:
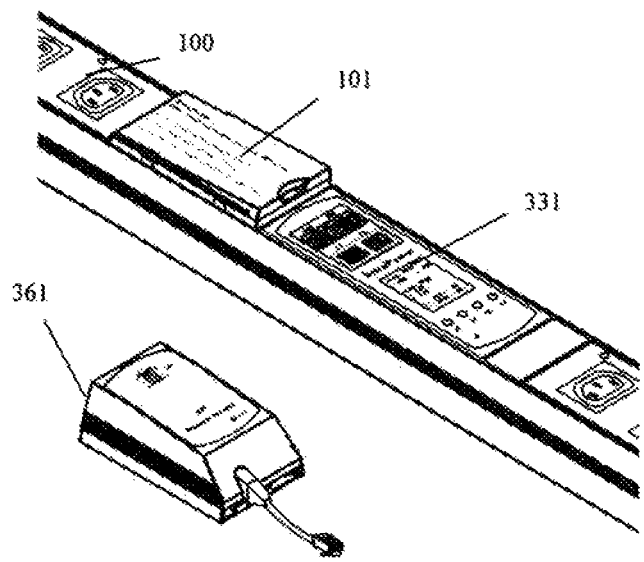
FIG. 3 shows a status view of the power distribution unit and the communication device before assembled in coordination of an embodiment of the present application.
Figure 4:
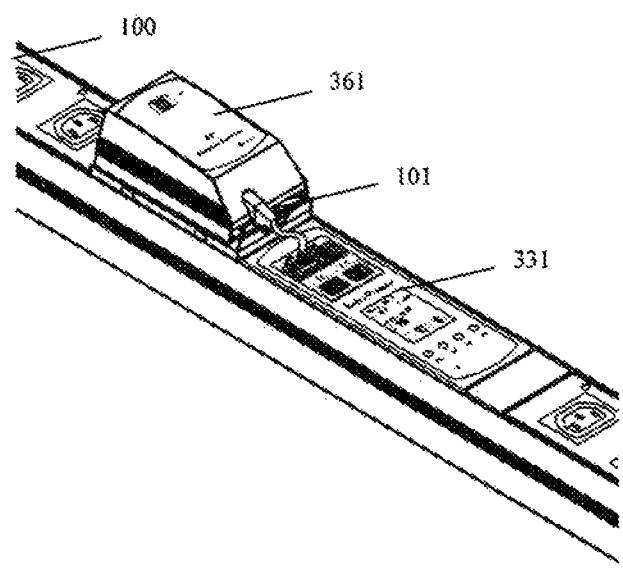
FIG. 4 shows a status view of the power distribution unit and the communication device after assembled in coordination of an embodiment of the present application.

As illustrated in FIG. 3, the detachable communication device 361 may be directly placed on and interlocked with the platform 101 of the power distribution unit housing 100. The coupling with other installation components is not necessary. The platform 101 includes an edge suitable for interlocking with the detachable communication device 361. Before the detachable communication device 361 and the power distribution unit are coupled and installed, the detachable communication device 361 and the power distribution unit are in separated status, which means that the detachable communication device 361 can be detached from the power distribution unit. The statuses of the detachable communication device 361 and the power distribution unit after coupled and installed are illustrated in FIG. 4.

The present application realizes intelligent remote monitoring and controlling of one or more types of internal parameters, i.e., power input, output, phase, cycle etc., of the power distribution unit and the surrounding environmental parameters of the power distribution unit. The power distribution unit can achieve cascading exceeding 255. The above illustrated cascading chain of the power distribution unit uses merely a detachable communication device and an IP address. By the above means, relatively less power and fewer network equipments are required, including hubs, routers and cables, etc. As a result, remote monitoring and controlling of the power distribution unit can be effectively achieved.

The above description combines specific embodiments and further describes the present application. One cannot presume that the present application is to be limited by any one of the above described embodiments. Not departing from the inventive concept of the subject invention, it is understood by the persons skilled in the art that simple alteration or deduction of elements to the subject invention is deemed covered by the scope of the present application.

The invention claimed is:

1. A power distribution unit comprising:
   a master management module; and
   at least one set of socket management modules which manages a power output,
   wherein the master management module connects to each of the socket management modules for monitoring the power output state of each of the socket management modules, and controlling the switching state of the power output of each of the socket management modules; the master management module further comprises an incoming port and an outgoing port for connecting to an external device and cascading the power distribution unit;
   a plurality of power distribution units cascade, the cascading of the plurality of power distribution units through individual master management module is in the form of a daisy-chain; only one master management module is directly connected to the external device; and data of other master management modules is transmitted to the master management module that is directly connected to the external device so that the data is sent to the external device.

2. The power distribution unit according to claim 1, wherein the master management module is a field replaceable module.

3. The power distribution unit according to claim 1, further comprising an internal management module that connects to the master management module for managing the power parameter of the power distribution unit, wherein the internal management module is monitored and controlled by the master management module.

4. The power distribution unit according to claim 3, wherein the internal management module comprising at least one of a power input management modules, a power phase management modules and a power supply management modules; wherein the master management module is connected to the power input management module, power phase management module and the power supply management module, respectively, for managing the power input through the power input management module, the power phase through the power phase management module and the power supply through the power supply management module.

5. The power distribution unit according to claim 1, further comprising a sensor module that connects to the master management module for obtaining the surrounding environmental parameters of the power distribution unit.

6. The power distribution unit according to claim 5, wherein the sensor module comprising at least one of temperature sensor, humidity sensor, door open/close state sensor, smoke sensor, vibration sensor, air flow sensor, dew point sensor, flood sensor, and sensor that detects the contact state with other equipments.

7. The power distribution unit according to claim 5, wherein the sensor module comprising an alarm instruction unit, for sending out alarming instruction when the environmental parameter has been detected as having reached a preset alarming value.

8. The power distribution unit according to claim 1, wherein the master management module comprising at least one environmental sensing connection port for sensing the surrounding environment parameters, wherein the said sensing connection port connects to a set of sensors.

9. The power distribution unit according to claim 1, further comprising a power adaptor for providing DC power supply to other modules.

10. The power distribution unit according to claim 1, wherein when the plurality of power distribution units cascade by serial and/or controller area network BUS (CAN-BUS), the number of cascades exceeds 255.

11. The power distribution unit according to claim 1, further comprising an LCD monitor for displaying locally.

12. A detachable communication device which is used in coupled with the power distribution unit according to claim 1.

13. The detachable communication device according to claim 12, comprising a connection cable for use with hot-plugging connection with the power distribution unit.

14. The detachable communication device according to claim 12, further comprising an encryption dongle for achieving software and/or hardware protection.

15. The detachable communication device according to claim 12, further comprising a wired network port for communicating with a network computer via wire, and/or a wireless network port for communicating wirelessly with the network computer.

16. The detachable communication device according to claim 15, wherein the wired network port is a RJ45 interface.

17. The detachable communication device according to claim 15, wherein a plurality of detachable communication devices share one network computer, wherein said network computer is capable of managing more than 65536 said detachable devices.

18. A power distribution system, comprising
   a plurality of cascaded power distribution units; the cascading of the plurality of power distribution units is in the form of a daisy-chain; and
   a detachable communication device detachable from connecting with the cascaded power distribution units; wherein
   each of the cascaded power distribution units comprises a master management module and at least one set of the socket management modules which manage power output; the master management module connects to each of the socket management modules for monitoring power output state of each of the socket management modules, and controlling the switching state of the power output of each of the socket management modules; the master management module comprises an incoming port and an outgoing port that are used for connecting to an external device and cascading a power distribution unit; and
   only one of the cascaded power distribution units is directly connected to the detachable communication device through the incoming port thereof, and data of other power distribution units is transmitted to the power distribution unit that is directly connected to the detachable communication device so that the data is sent to the detachable communication device.

19. The power distribution system according to claim 18, wherein a platform with an edge for coupling with the detachable communication device is provided on the power distribution unit that is directly connected to the detachable communication device and the detachable communication device is placed directly on and interlocked with the power distribution unit that is directly connected to the detachable communication device by the platform without additional installation components.

* * * * *